United States Patent [19]

Natale

[11] Patent Number: 4,613,348
[45] Date of Patent: Sep. 23, 1986

[54] DISPOSABLE HEPA FILTRATION DEVICE

[76] Inventor: Anthony Natale, R.D. 2, Ark Rd., Box 2350, Mount Holly, N.J. 08060

[21] Appl. No.: 704,508

[22] Filed: Feb. 22, 1985

[51] Int. Cl.$^4$ ............................................. B01D 46/02
[52] U.S. Cl. ........................................ 55/318; 55/350; 55/420; 55/467; 55/508; 55/DIG. 3; 15/347
[58] Field of Search ................................. 15/347, 353; 55/318–320, 467, 472, 482, 502, 508, 97, DIG. 3, 350, 322, 420

[56] References Cited

U.S. PATENT DOCUMENTS

| | | | |
|---|---|---|---|
| 3,032,954 | 5/1962 | Racklyeft | 55/472 X |
| 3,103,426 | 9/1963 | Lantz | 55/420 X |
| 3,605,786 | 9/1971 | Machin | 55/420 X |
| 3,616,624 | 11/1971 | Marsh | 55/472 X |
| 3,928,008 | 12/1975 | Petersen | 55/472 |
| 4,072,483 | 2/1978 | Doyle, Jr. | 55/372 |
| 4,118,208 | 10/1978 | Klinedinst | 55/472 X |
| 4,175,934 | 11/1979 | Lang et al. | 55/482 X |
| 4,229,193 | 10/1980 | Miller | 55/318 |
| 4,333,745 | 6/1982 | Zeanwick | 55/97 |
| 4,334,900 | 6/1982 | Neumann | 55/482 X |
| 4,543,112 | 9/1985 | Ackley et al. | 55/420 X |
| 4,559,067 | 12/1985 | Durston | 55/324 |

OTHER PUBLICATIONS

"Astrocel", American Air Filter, CAD1-110-E, Jul. 84.

Primary Examiner—Charles Hart
Attorney, Agent, or Firm—Fleit, Jacobson, Cohn & Price

[57] ABSTRACT

A sealed filtration cannister including a filtration mechanism sealed within the cannister. A prefilter and a HEPA filter entrap asbestos-containing dust within the sealed cannister. Upon usage of the filtration cannister for a predetermined number of hours, the cannister is disposed of in its entirety. The cannister is used in conjunction with a separate vacuum cleaner device having a suction hose communicating with a cannister lid removably mounted on top of the cannister. Alternately, the cannister is used with a portable vacuum motor assembly removably mounted on top of the cannister to provide independent suction to the filtration cannister.

16 Claims, 4 Drawing Figures

DISPOSABLE HEPA FILTRATION DEVICE

BACKGROUND OF THE INVENTION

Asbestos has traditionally been used as a heat insulating, fireproof material. Prior to the recent concern about the health hazards involved with the use of asbestos, asbestos was extensively used in all fields of construction. With the recent public awareness of the detrimental effects of the exposure to asbestos fibers found in airborne dust and the like, many clean-up campaigns have been undertaken to eliminate asbestos and asbestos-containing dust from public places. Asbestos-containing dust has therefore now become a major health concern.

Asbestos-containing dust is generated during the removal of asbestos, routine building renovations and building maintenance. Asbestos-containing materials have been found to regularly sluff off from pipe and boiler covering materials, ceiling coverings, and insulation. Particular attention has now been given to this problem in schools and other public buildings where accumulations of asbestos-containing dust is commonly found in corridors, rooms and maintenance areas.

The clean up of asbestos-containing dust is a problem unto itself. The fine asbestos particles found in asbestos-containing dust present asbestos in its most dangerous form. Asbestos fibers in dust easily take flight on air currents and can readily circulate throughout an entire air circulation system of a building. The levels of contamination, though invisible to the human eye, are often as high as those levels of contamination which have been documented to cause significant percentages of cancer in exposed populations.

Discussion of the Prior Art

Present practice for the removal of asbestos-containing dust includes the use of industrial machines for the removal of toxic dust. These machines are large, heavy-duty vacuum cleaners, specially designed for this purpose. The vacuum cleaners are equipped with special internal HEPA filtration systems. They operate by placement of a vacuum cleaner hose adjacent to asbestos-containing dust and create a vacuum to suck in dust through the hose. The air suction of the vacuum cleaner through the hose draws dust into the unit where large debris is trapped in coarse, disposable filter bags. Exhausted air is then forced through thick HEPA filtration material, which traps the sub-micron sized fibers. The air exiting the unit is clear of toxic material.

A serious unpublicized, but widely-recognized problem, associated with even sophisticated HEPA vacuum cleaners is that these machines must be emptied when they become full with asbestos containing debris. The only method for emptying these machines is to open the machine, take out the bag of collected asbestos debris and dispose of the contaminated bag. This process creates substantial amounts of air borne contamination and is quite hazardous to the operator.

Another attempt to remove asbestos-containing dust includes the use of standard vacuum cleaners which are, in effect, asbestos recontamination machines since they contain no HEPA filter or other asbestos decontamination mechanism. Asbestos-containing dust is drawn into a non-HEPA filtered vacuum cleaner trapping the debris in a disposable debris bag. The air exhausted from the machine is filled with asbestos fibers and is circulated into the surrounding environment by the force of the exhausted air.

U.S. Pat. No. 4,072,483 to Doyle, Jr., discloses a vacuum cleaner employing a plurality of filters for picking up asbestos fibers. When it is desired to dispose of the asbestos fibers, the cover of the vacuum cleaner is removed and the filters are manually pulled from the tank, exposing the operator to asbestos contamination.

U.S. Pat. No. 4,229,193 to Miller, discloses a filter bag for a vacuum cleaner. The filter bag includes a primary filter bag, an impermeable shield and a secondary filter as a single unit. The filters are encapsulated within the impermeable shield. The area of the impermeable shield, which surrounds the opening into the primary filter bag, has an opening therethrough which is aligned with and is the same size as an opening of a container through which a hose connection with the container is made. The opening communicates through the impermeable shield and through the inlet of the primary filter bag, into the interior of the filter bag. To dispose of the filter bag, the bag must be removed from the vacuum cleaner.

SUMMARY OF THE INVENTION

The present invention includes a sealed disposable cannister containing a HEPA filtration mechanism which is inexpensive enough to justify its occasional use in public places, where from time to time, clean up of small quantities of asbestos-containing dust is required. Once full with asbestos containing dust, the entire sealed cannister including the HEPA filtration mechanism can be disposed of without recontamination of the surrounding environment or exposure of the operator to harmful asbestos fibers. The cannister filtration device of the present invention can be used in conjunction with a standard vacuum cleaner or with a removable vacuum motor assembly. The sealed cannister includes an intake port having an inlet pipe extending therethrough with a hinged valve biased against the interior end of the inlet pipe and an exhaust port located adjacent to the top of the cannister. The interior of the sealed cannister contains a HEPA filter and a collection space for debris.

In one embodiment of the present invention, the intake hose of a standard vacuum cleaner is plugged into an opening defined by a cannister lid which is removably mounted on top of the cannister. A support plate defining the exhaust port is sealed within the cannister. The support plate spans across the interior of the cannister and is spaced from the cannister lid. The vacuum cleaner thus provides suction to the exhaust port of the sealed cannister.

A disposable, plastic hose is plugged into the intake pipe extending through the inlet port which is located on the side of the sealed cannister. Asbestos-containing dust and air are drawn into the sealed cannister through the open end of the disposable hose, and the sealed cannister acts as a filtering intermediary between the standard vacuum cleaner and asbestos-containing dust. The large particles of asbestos-containing debris are deposited, by gravity, in a debris collection area located at the bottom of the cannister. The air drawn into the cannister, including fine dust and asbestos particles, continues to be sucked toward the exhaust port and is forced through a prefilter and approximately 6 inches of HEPA filter material. The HEPA filter material removes substantially all the asbestos fibers from the air. The air is then drawn from the exhaust port of the support plate located adjacent to the HEPA filter and exits from the sealed cannister through the opening of the cannister lid, free of asbestos contamination. The intake hose of the standard vacuum cleaner, connected to the opening of the cannister lid of the sealed cannister, thereby draws uncontaminated air from the exhaust port of the sealed cannister.

In a second embodiment of the present invention, a portable vacuum motor assembly fits on top of the cannister, instead of the cannister lid. In one form, it is removable from the cannister. The vacuum motor assembly creates suction on an air space located above the exhaust port. The support plate, defining the exhaust port, is sealed to the inside of the cannister. The vacuum motor assembly draws air into the cannister through the disposable vacuum hose connected to the inlet pipe and through the HEPA filtration mechanism. The uncontaminated air exiting through the exhaust port located adjacent to the HEPA filter is sucked out to the surrounding atmosphere by the vacuum motor assembly.

Once the total recommended hours of use of the sealed cannister is completed, the exhaust port and inlet pipe of the sealed cannister may be plugged to seal in all asbestos contamination. However, this is only an added precaution to trap the asbestos particles in the HEPA filter and to avoid migration of the particles to the surrounding environment. The inlet pipe is also sealed by the biased valve located at its interior end. Therefore, all the asbestos contaminated material is effectively sealed within the cannister. The sealed cannister then functions as its own disposable unit, meeting all asbestos disposal requirements and avoiding the possibility of recontaminating the atmosphere or endangering the operator by exposure to asbestos during disposal.

It is an object of the present invention to overcome the disadvantages of the prior art and provide a disposable device for collecting asbestos containing dust.

It is another object of the present invention to effectively collect asbestos-containing dust without exposing the operator to asbestos during collection and disposal of the asbestos-containing dust.

It is yet another object of the present invention to seal asbestos-containing materials in a filtration cannister for disposal of the asbestos-containing material without exposing the operator to the asbestos-containing material during disposal.

It is still another object of the present invention to provide a filtration cannister, having an inlet port with an inlet pipe extending therethrough and an exhaust port, which are effectively sealed for protecting an operator and the surrounding environment from exposure to asbestos-containing materials during collection and disposal of asbestos-containing dust.

DETAILED DESCRIPTION OF THE PREFERRED EMBODIMENTS

Figure 1:
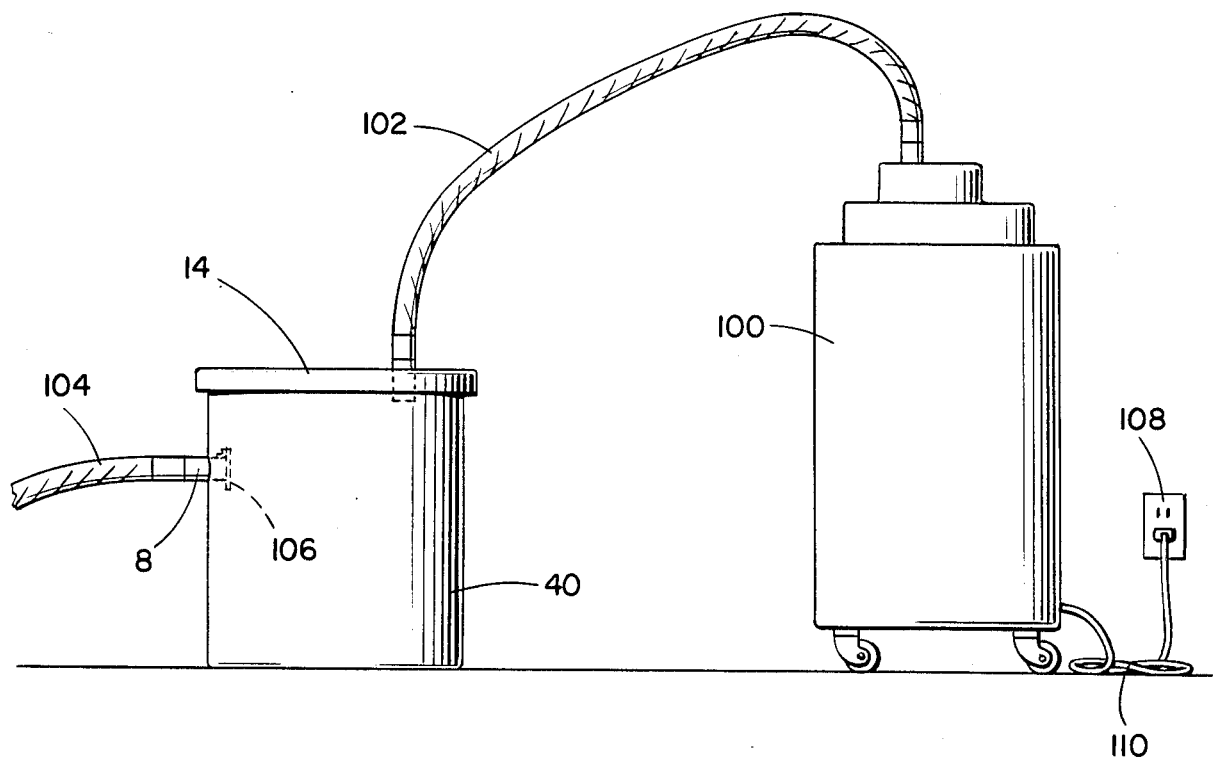
FIG. 1 illustrates a disposable vacuum hose connected to the sealed disposable cannister of the present invention, and a standard vacuum cleaner interconnected to create the vacuum power for the sealed cannister.

FIG. 1 illustrates the interconnection of sealed cannister 40 with vacuum cleaner apparatus 100. A vacuum hose 102 extends from the vacuum cleaner 100 to the cannister lid 14 which is located on top of the sealed cannister 40. End 106 of disposable vacuum hose 104 extends into the interior of the sealed cannister 40 through the inlet pipe 8. A power source 108 is connected to vacuum cleaner 100 by wire 110.

Asbestos-containing dust and air are sucked into sealed cannister 40 by vacuum hose 104. The asbestos-containing dust and air enter the sealed cannister 40 through the end 106 of vacuum hose 104. The asbestos containing dust is filtered as it travels through the sealed cannister. Uncontaminated air exiting from the cannister 40 travels through vacuum hose 102 to the vacuum source, vacuum cleaner 100. The uncontaminated air is exhausted from the vacuum cleaner 100 into the surrounding environment.

Figure 2:
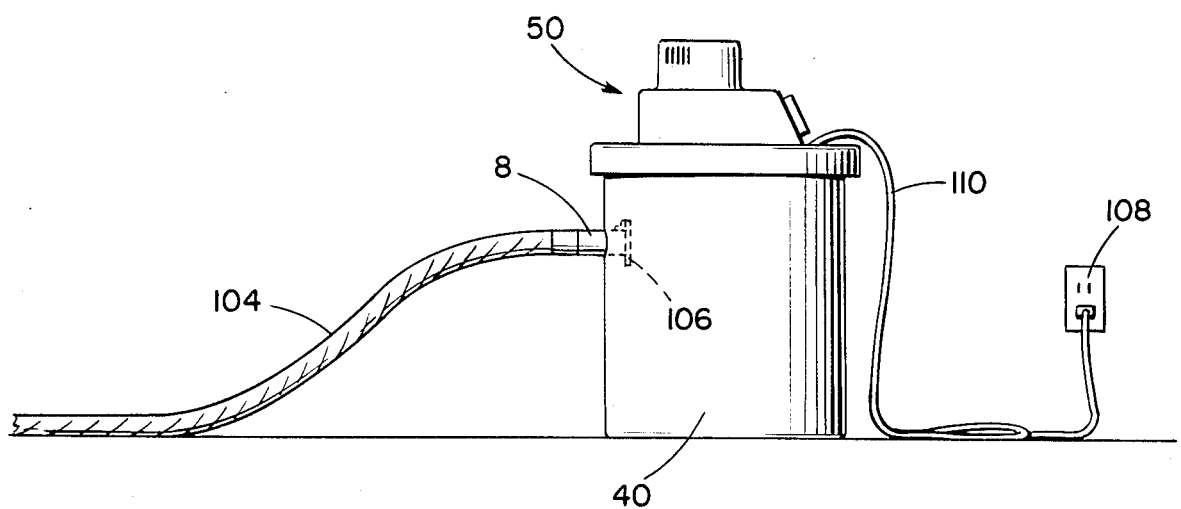
FIG. 2 illustrates a disposable vacuum hose connected to the sealed cannister of the present invention, and a vacuum motor assembly mounted on top of the sealed cannister for vacuum power.

In FIG. 2, end 106 of disposable vacuum hose 104 is inserted through inlet pipe 8 to project into the interior of the sealed cannister 40. A vacuum motor assembly 50 is located on top of the container 40 and is connected by wire 110 to power source 108. Asbestos-containing dust and air are drawn through vacuum hose 104 into sealed cannister 40. Uncontaminated air is withdrawn from the top of the sealed cannister 40 by vacuum motor assembly 50. The uncontaminated air is exhausted from the vacuum motor assembly into the surrounding environment.

Figure 3:
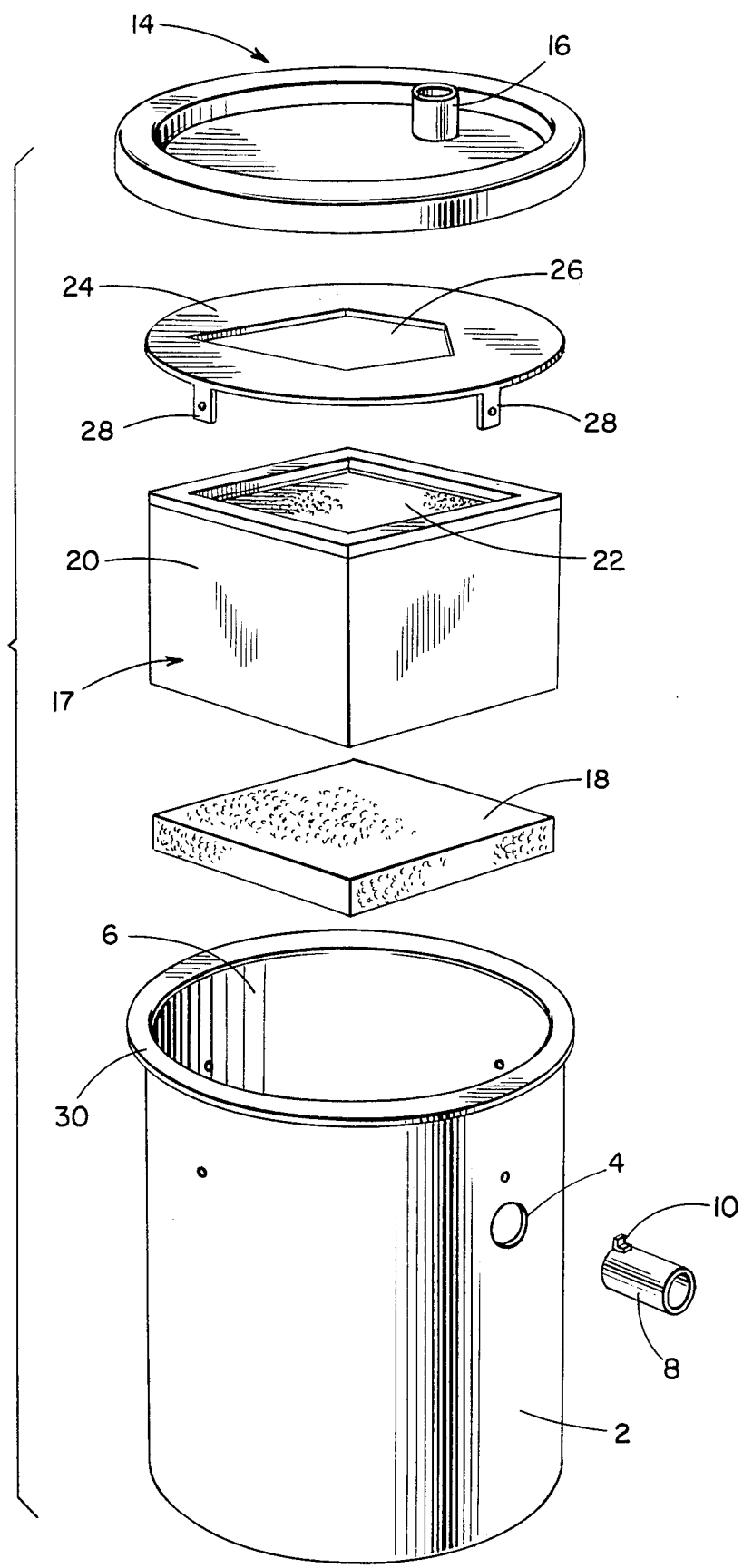
FIG. 3 is an exploded side view of the disposable cannister of the present invention with the removable lid for use with a separate vacuum cleaner, as shown in FIG. 1, including the elements which are to be sealed inside the cannister.
Figure 4:
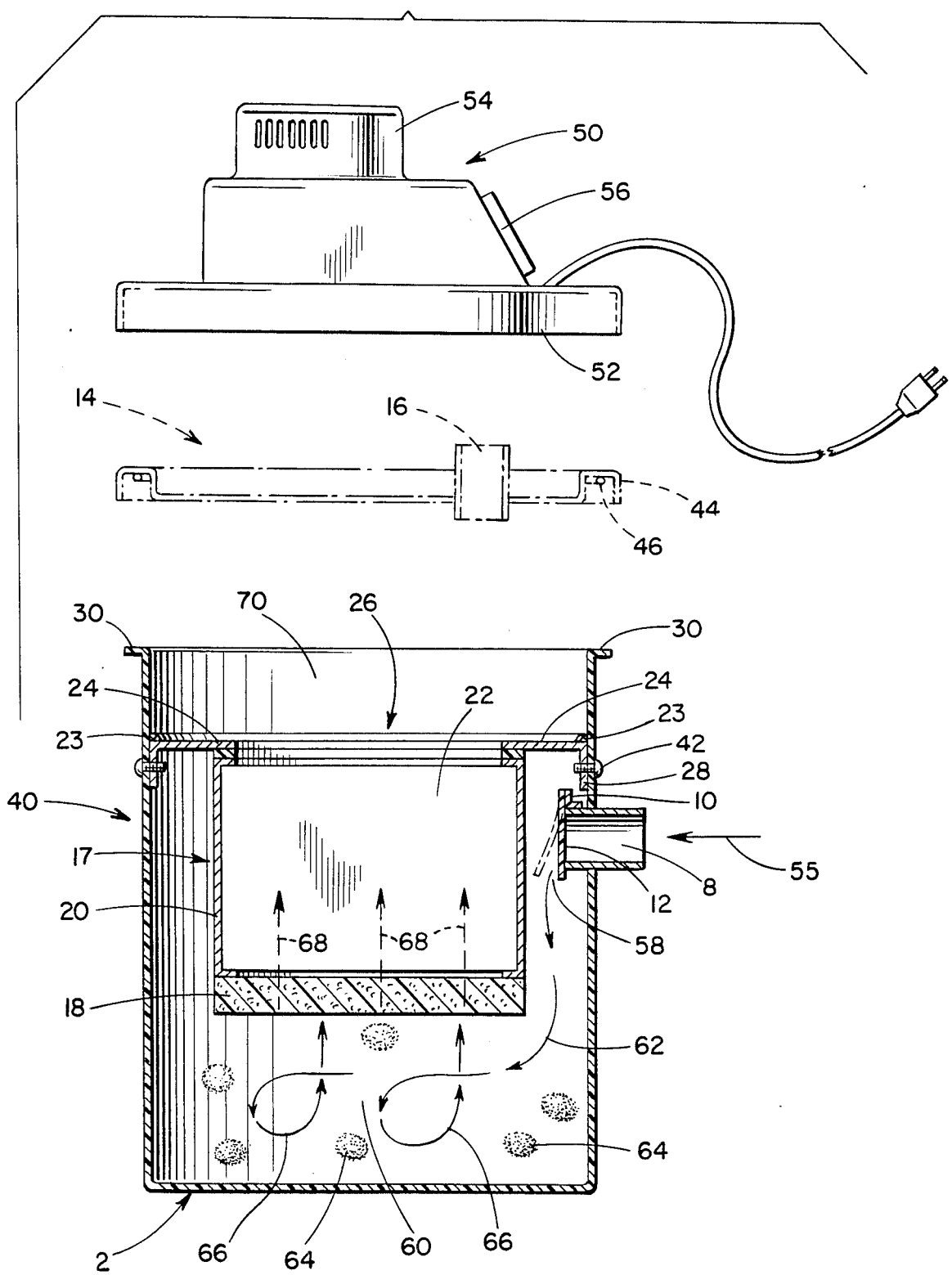
FIG. 4 is an exploded sectional side view of the present invention showing the sealed cannister with an alternately usable cannister lid as shown in FIGS. 1 and 3 or a vacuum motor assembly as shown in FIG. 2.

In FIG. 3, a cannister 2 is shown having a top open end 6 and a side inlet port 4. The cannister 2 is preferably a conventional drum made of rigid plastic material, such as polyethylene, polystyrene, polymethylmetacrylate, polyurethane, etc. having a capacity in the neighborhood of 5 to 55 gallons. An inlet pipe 8, shown spaced from the cannister 2 in FIG. 3, is normally positioned extending through inlet port 4, so that part of the inlet pipe 8 extends outwardly from the side of the cannister and part of the inlet pipe extends into the cannister, as shown in FIG. 4. Hinge 10 is located at the interior end of inlet pipe 8. Hinge 10 resiliently biases one end of a damper valve 12 against the interior end of pipe 8 to seal the pipe.

Sealing the top of the sealed cannister of the present invention is a support plate 24 which defines an exhaust port 26 centrally located in the plate. Projecting tabs 28 are spaced about the circumference of the support plate 24 and extend perpendicular to the top surface of the support plate. The support plate 24 is secured to the inside of the cannister 2 by its tabs 28 above the outlet port 4 and at a distance from the top edge 30 of the cannister 2. The tabs are secured by screws, bolts or like fasteners (see bolts 42 in FIG. 2). The support plate is sealed to the interior walls of the cannister by a layer of silicone or other sealant interconnecting the support plate and side walls. The cannister lid 14 fits over the outer edge 30 of the top of the open end 6 of the cannister 2 to form an air space between the lid and the support plate 26.

Supported below the support plate 24 in the interior of the cannister 2, as by screws, glue or the like, is the HEPA filter mechanism 17. Filter mechanism 17 includes prefilter 18, measuring approximately one-half to one inch thick, which filters particles of a size greater than 5 microns. Prefilter 18 is secured to the bottom of filter casing 20 to block off the bottom end of filter casing 20. The casing 20 is made of a durable, air impermeable substance such as wood, rigid plastic, metal, etc. Thus, particles which do not pass the prefilter 18 are removed from the air stream and deposited in the bottom of cannister 2.

Housed within the casing 20 is filter 22. Filter 22 is a high efficiency particulate air (HEPA) filter which is 99.99% effective in filtering out particles of a size greater than 0.3 microns. Filter 22 fills substantially all of the interior of casing 20, providing 6 inches of HEPA filter thickness through which the asbestos laden air must pass. The filter 22 blocks off the top end of casing 20, and the support plate 24 is so positioned at the top of the casing 20 that the exhaust port 26 exposes filter 22. The filter 22 may include a pleated surface for increased surface area exposure to the asbestos-containing air and to provide less resistance to the flow of air through the filter.

An opening 16 is defined by the cannister lid 14. The cannister lid 14 is placed over the top of the open end 6 of the cannister 2. The cannister lid is used in the embodiment shown in FIG. 1, where a vacuum cleaner 100, having a vacuum hose 102 extends from the vacuum cleaner to the opening 16 of cannister lid 14 of the filtration cannister 40.

In FIG. 4, the sealed filtration cannister 40 is shown in its assembled form with the alternative assembly forms: a removable lid (for use with a standard vacuum cleaner) or a separate vacuum motor assembly 50. The support plate 24 is fixedly sealed to the inside wall of the cannister 2 at a distance from the open end 6 of the cannister 2. Projecting tabs 28 are secured to the inside wall of the cannister by bolts 42 extending from the outside of the cannister through the side wall. HEPA filter 22 is sealingly mounted to the top of casing 20, below the exhaust port 26 of the support plate. The HEPA filter blocks the entire exhaust port 26. Sealingly engaging the bottom opening of the casing 20 is prefilter 18. Prefilter 18 blocks the entire bottom opening of the casing.

Inlet pipe 8 projects through the inlet port located at the side of the cannister 2. Inlet damper valve 12 is secured to hinge 10 which is secured to the interior end of inlet pipe 8. Inlet damper valve 12 is biased to sealingly engage the interior end of the inlet pipe 8. Hinge 10 is biased to force the damper valve 12 against the inlet pipe 8 to form a seal. Hinge 10 and damper valve 12 form, in one embodiment, a check valve, made of flexible plastic. The pipe 8 can be capped to form an airtight seal. The support plate 24 is sealed to the interior wall of the cannister by a silicone fillet 23 extending from the edge of the support plate to the interior walls of the cannister. The support plate forms an airtight seal with the cannister to prevent air from travelling from the interior of the cannister which is defined between the bottom and side walls of the cannister and the support plate. Air only enters the cannister through inlet pipe 8 and exits from the interior of the cannister through exhaust port 26.

Removable cannister lid 14 is shown in FIG. 4 positioned above the cannister 2. U-shaped flange 44 includes a sealing O-ring 46 which engages the flange 44 and top edge 30 of the cannister 2 when the cannister lid 14 is removably held onto the open end 6 of the cannister 2. The lid is held by clamps or other suitable holding devices (not shown). The opening 16 defined by the cannister lid 14 is positioned, spaced from the vertical plane extending from the exhaust port 26. This prevents any damage, by a vacuum hose inserted into opening 16, to the filter 22 exposed below exhaust port 26. This space also provides an air space above exhaust port 26 in which the vacuum power source can create the necessary vacuum in the sealed unit in advance of the filtering mechanisms. The cannister lid 14 is used in conjunction with the sealed filtration cannister 40 in one embodiment of the present invention. Alternatively, the lid 14 can be rigidly secured to the top of cannister 2. As so constructed the decontamination unit would be used in the FIG. 1 embodiment and the integral top disposed with the unit.

Shown in FIG. 4 is vacuum motor assembly 50 including support member 52, motor housing 54 and exhaust opening 56. The vacuum motor assembly 50 is used, in conjunction with the sealed filtration device 40, as an alternate embodiment of the present invention from that embodiment using the cannister lid 14. The vacuum motor assembly 50 is removably held on the top edge 30 of the cannister 2 by clamps or other suitable holding devices (not shown) for creating suction of air from the exhaust port 26.

The vacuum motor assembly 50 is interchangeable with the cannister lid 14 for sealing the air space 70 defined above the support plate 24. When the cannister lid 14 is used, as shown in FIG. 1, a vacuum cleaner 100 is used in conjunction with the sealed filtration cannister 40. The inlet vacuum hose 102 of the vacuum cleaner 100 is placed within opening 16 of the cannister lid 14. The cannister lid is removably held onto the cannister. Upon actuation of the vacuum cleaner, suction is created on the air space 70, exhaust port 26, filter 22, prefilter 18 and inlet pipe 8.

In the alternate embodiment shown in FIG. 2, the vacuum motor assembly 50 is removably held on the top edge 30 of the cannister 2. The vacuum motor assembly creates suction on air space 70, exhaust port 26, filter 22, prefilter 18 and inlet pipe 8. Air is exhausted through opening 56 to the atmosphere.

In the operation of the present invention, as shown in FIGS. 1, 3 and 4, suction created in sealed cannister 40, by a separate vacuum cleaner 100, is introduced by a vacuum hose 102 through an opening 16 of the cannister lid 14. In FIGS. 2 and 4, vacuum cleaner assembly 50 creates suction through sealed cannister 40 to evacuate the air within the cannister. A disposable vacuum hose 104 used to pick up asbestos-containing dust is inserted into inlet pipe 8 such that one end 106 of the vacuum hose 104, shown in phantom, pushes open the inlet damper valve 12 and the disposable vacuum hose 104 communicates with the inside of the sealed filtration device 40. When the vacuum cleaner 100 communicating with the opening 16 or vacuum motor assembly 50 is activated, air is drawn in through the disposable vacuum hose 104, as indicated by arrow 55 in FIG. 4. Air, including asbestos-containing dust, travels through inlet pipe 8, past the inlet damper valve 12 which has been forced open by the insertion of the disposable vacuum hose 104. As shown by arrow 62 in FIG. 4, the air entering past damper valve 12 encounters air impermeable casing 20 and is deflected by the casing. The air moves downwards along channel 58 into debris containment area 60. In the debris containment area 60, the large particles 64 of dust and asbestos settle to the bottom of the cannister 2. The air and fine particles of asbestos, as shown by arrows 66, continue on their path toward the suction source located above exhaust port 26.

The asbestos-containing air passes through prefilter 18 located at the bottom of casing 20 where asbestos particles and fibers of greater than 5 microns in size are screened. Those particles less than 5 microns in size continue up into filter 22, as shown by air flow streams 68. In HEPA filter 22, particles of asbestos of greater than 0.3 microns are screened. The filtered, non-contaminated air exits through the exhaust port 26 of the support plate 24 into air space 70. The air is then drawn through opening 16 of cannister lid 14 which is connected by a vacuum hose 102 to a vacuum cleaner 100, or in the case where the vacuum motor assembly 50 is mounted on top of the cannister 2, the air is exhausted through outlet 56. In either event, asbestos free air is drawn from the exhaust port 26 of the sealed filtration cannister.

When the sealed filtration cannister 40 has been used for a predetermined number of hours, the disposable vacuum hose 104 is removed from inlet pipe 8 and the sealed cannister, including the HEPA filtration mechanism, is disposed of in its entirety. The solid particles 64 and fine particles entrapped in the cannister, prefilter and HEPA filter are disposed of with the sealed cannister. During disposal of the cannister, there is no exposure of asbestos to the operator. All of the collected asbestos particles are trapped within the sealed cannister 40.

The disposable filtration cannister of the present invention is relatively inexpensive and therefore is highly efficient for the cleaning up of asbestos-containing dust, without reguiring the purchase of an expensive, specially designed vacuum cleaning apparatus. The operator of the present invention is also guarded against recontaminating the atmosphere with asbestos fibers during use of the sealed filtration cannister and is protected from exposure to asbestos fibers during disposal of the sealed filtration cannister.

Although the present invention has been described in connection with a preferred embodiment thereof, many variations and modifications will now become apparent to those skilled in the art. It is preferred, therefore that the present invention be limited not by the specific disclosures herein but only by the appended claims.

I claim:
1. A sealed filter device for filtering asbestos contaminated air sucked through said device comprising
   a sealed contact having a sealed top, bottom, and sides, whereby said sealed cannister may be adapted to be disposed of after a predetermined amount of use,
   filter means supported within said cannister and spaced above said bottom, said filter means including a filter casing, a HEPA filter and a prefilter,
   an inlet to the interior of the cannister located upstream from said prefilter whereby particles, sucked into the sealed cannister which are too large to pass through said prefilter will collect adjacent the bottom of the sealed cannister,
   sealing means for sealing said inlet against passage of air out of said sealed cannister and allowing passage of air into said sealed cannister when the interior of said sealed cannister is subjected to a suction force, and
   outlet means for the sole egress of air from said sealed cannister being in communication with said HEPA filter for exiting air passing through said filter means.

2. A sealed filter device as claimed is claim 1, wherein, said HEPA filter being mounted in said filter casing and said prefilter is secured to the bottom of said casing, the flow of air moving from said inelt, through said prefilter, through said HEPA filter and exiting through said outlet means.

3. A sealed filter device as claimed in claim 2, further comprising a particle collection area defined by said sealed cannister for collecting particles being drawn in through said inlet, said particle collection area being located below said filter casing and said filter means being located in said filter casing spaced from said particle collection area.

4. A sealed filter device as claimed in claim 1, wherein said prefilter is located at the end of the HEPA filter opposite to the end of the HEPA filter which is located in communication with said outlet and said prefilter being spaced from the bottom of said sealed cannister.

5. A sealed filter device as claimed in claim 1, further comprising a container lid defining an opening, said container lid being releasably mounted on top of said sealed top of said cannister.

6. A sealed filter device as claimed in claim 1, further comprising a vacuum motor assembly being releasably mounted on top of said sealed top of said cannister.

7. A sealed disposable filtration device for filtering asbestos contaminated air sucked through said device comprising:
   a sealed cannister having a sealed bottom, top, and sidewalls,
   inlet means to said cannister,
   sealing means for sealing said inlet means against passage of air out of said sealed cannister and allowing passage of air into said sealed cannister when the interior of said sealed cannister is subjected to a suction force,
   exit means defined in said sealed top for the sole egrees of air from said sealed cannister, and
   HEPA filter means including a filter casing secured in said sealed cannister below said sealed top and surrounding said exit means whereby air sucked through said inlet means and exhausted through said exit means must pass through said HEPA filter means and substantially all asbestos contamination will be entrapped in said sealed cannister, whereby said sealed cannister may be adapted to be disposed of after a predetermined amount of use.

8. A disposable cannister as in claim 7, wherein said filter means includes a prefilter for entrapping particles greater in size than 5 microns and a HEPA filter for entrapping particles greater in size than 0.3 microns, said HEPA filter being located adjacent to said exhaust means.

9. A disposable cannister device as in claim 8, wherein said filter casing is secured to a mounting plate, said HEPA filter being mounted in said filter casing and said prefilter being secured to the bottom of said filter casing, the flow of air moving from said inlet pipe, through said prefilter, through said HEPA filter and exiting through said exit means.

10. A disposable cannister as in claim 7, wherein said filter casing is impermeable to air flow is secured to a said support plate and is located adjacent to said inlet means for diverting air flow from said inlet means along the side of said filter casing.

11. A disposable cannister as in claim 7, further comprising a particle collection area defined by said sealed cannister for collecting particles being drawn in through said inlet means.

12. A disposable cannister as in claim 10, further comprising a particle collection area defined by said sealed cannister for collecting particles being drawn in through said inlet pipe, said particle collection area being located below said filter casing and said filter means being mounted in said filter casing spaced from said particle collection area.

13. A disposable cannister as in claim 9, wherein said prefilter is located at the end of the HEPA filter opposite to the end of the HEPA filter which is located adjacent to the exit means and said prefilter being spaced from the bottom of said sealed cannister.

14. A disposable cannister as in claim 10, further comprising an air space within said sealed cannister defined above said support plate.

15. A disposable cannister as in claim 14, further comprising a container lid defining an opening, said container lid being releasably mounted on top of said sealed top of said cannister.

16. A disposable cannister as in claim 14, further comprising a vacuum motor assembly being releasably mounted on top of said sealed top of said cannister.

* * * * *